UNITED STATES PATENT OFFICE.

JOHN PURING, OF NEW YORK, N. Y., ASSIGNOR TO ROBESON PROCESS COMPANY, OF NEW YORK, N. Y., A CORPORATION OF NEW JERSEY.

PROCESS OF DYEING.

1,236,868.  Specification of Letters Patent.  Patented Aug. 14, 1917.

No Drawing.   Application filed September 16, 1916.  Serial No. 120,463.

*To all whom it may concern:*

Be it known that I, JOHN PURING, a citizen of Russia, residing at New York, in the county of New York and State of New York, have invented certain new and useful Improvements in Processes of Dyeing, of which the following is a specification.

This invention relates to processes of dyeing; and it comprises a method of dyeing wool, silk, etc., in various shades wherein the fabric or yarn is impregnated with a sulfite waste liquor preparation and iron and treated with color developing materials, such as pyrogallic acid, the treatment being in one or two stages as the case may be; all as more fully hereinafter set forth and as claimed.

Sulfite waste liquor is the watery effluent from processes of making paper pulp by digesting wood with acid sulfites; usually acid sulfite of lime or of magnesia. In the operation about half the wood remains undissolved as cellulose; the other half of the wood, or the so-called lignone component, dissolves and unites with the sulfurous acid and the base to form salts of new, complex organic acids; these salts being usually called lignosulfonates for the sake of a name. Where the sulfite liquor is a lime compound, the lignosulfonate in solution is a calcium compound; where it is a magnesia compound the lignosulfonate is a magnesium compound. Using dolomitic lime for making sulfite liquor there are produced lignosulfonates of calcium and magnesium. These lignosulfonates are quite soluble and, as found in the light sulfite liquor, readily decompose. By proper manipulation, including a preliminary neutralization of free acid and evaporation *in vacuo*, the sulfite liquor can be converted into suitable concentrated, stable, commercial products of 30 Bé. or higher. It is material of this character which I particularly contemplate in the present invention although the thin or light liquor may also be used. The sulfite waste liquor may come from the treatment of any woody material. That made in the treatment of spruce is quite well adapted for my purposes. In the concentrated 30 Bé. commercial material, as stated, the lignosulfonic acid is combined, usually, with calcium and magnesium. I have found that by treating this material with sulfate of iron (ferrous sulfate) or chlorid of iron, I can produce a useful mordanting and dyeing composition. The ferric salts may be used but are not as suitable. On mixing sulfate of iron in solution with waste sulfite liquor, there are formed by double interchange, calcium sulfate which precipitates and lignosulfonate of iron which remains in solution. The calcium sulfate may be filtered off or settled out. On dipping wool or silk in a bath so produced it is colored a grayish brown. By treatment of the so-dipped or impregnated yarn or fabric with various chemical materials a number of colors may be developed. For example, on immersing in a solution of pyrogallic acid the fabric assumes a blue black. By using gallic acid, blue, black and navy blue tones may be produced. Extracts of gall nuts and other materials containing tannin produce grays and bluish grays. If the impregnated iron or fabric be treated with a weak solution of chromic acid, golden browns are produced. All the colors so produced are fast to alkali, and, to a considerable extent, to acids.

Instead of dyeing in a 2-stage operation as just described, a 1-stage operation may be employed, the color developing material being mixed with the bath of iron salt and waste sulfite liquor.

In a specific embodiment of the present invention producing a fast black, one part by volume of commercial 30 Bé. concentrated waste sulfite liquor may be mixed with one part of a saturated solution of ferrous sulfate; a solution containing about 40 per cent. of $FeSO_4.7$ aq. The iron sulfate solution may be weaker. The mixture is warmed to facilitate admixture and promote reactions. A precipitate of calcium sulfate forms which may be removed by allowing to stand and settle. Or the mixture may be filter pressed. It is well to allow the mixture to stand several hours to promote formation and deposition of this precipitate. In the clear bath formed as described woolen goods are soaked or immersed for about two hours. It is better to have it warm, say 60 to 70 degrees C. After removal, the goods may be rinsed and dried. The goods may next be immersed in a solution of pyrogallic acid, the solution being, say, of a strength of about 10 grams of commercial pyrogallic acid in a liter of water. The goods are then removed, rinsed and dried. Wool will be found dyed a bluish blank. Silk is dyed the same color. In the case of silk it is better to operate at a somewhat lower temperature; say with a lukewarm bath.

On removal from the second bath, if the color appears bluish black on removal the goods will become deep black on drying. If the hue appears somewhat grayish it is better to reimmerse in the second bath for about 10 minutes more without rinsing it off.

For blue-blacks or navy blue, gallic acid may be used in lieu of pyrogallic acid.

For direct dyeing, the bath made as previously described may be directly mingled with the solution of pyrogallic acid. A better bath is made by dissolving 2 kilograms of commercial sulfate of iron (green vitriol) in 10 liters of water, stirring in 10 liters of commercial 30 Bé. sulfite liquor and after settling out the sulfate of lime, adding 200 grams of commercial pyrogallic acid in 20 liters of water. This compound bath will directly dye wool and silk and is also capable of use on cotton goods. In some instances I have found that the blacks with liquors prepared from spruce wood give somewhat faster colors to acid. The bath may be used as an ink. The spruce extract preparation is not as well adapted for inks as are other sulfite liquors, such as those from hemlock.

By treating the goods with the first described bath, i. e., one containing waste sulfite liquor and iron sulfate or chlorid and then using a second bath of other materials, light colors may be produced. Potassium bichromate solution as the second bath gives a reddish brown and titanium oxalate a golden brown.

What I claim is:—

1. The process of dyeing which comprises treating textile materials with a solution containing sulfite waste liquor and an iron salt, and with a color developing material.

2. The process of dyeing which comprises treating textile materials with a solution comprising commercial concentrated sulfite waste liquor and sulfate of iron and thereafter treating such materials with a color developing substance.

3. The process of dyeing which comprises treating textile materials with a solution comprising commercial concentrated sulfite waste liquor and sulfate of iron and thereafter treating such materials with a solution containing pyrogallic acid.

4. The process which comprises admixing a solution of concentrated commercial sulfite waste liquor with a solution of iron sulfate, removing calcium sulfate and thereafter exposing the product formed to the action of a color developing chemical.

5. The process which comprises admixing a solution of concentrated commercial sulfite waste liquor with a solution of iron sulfate, removing calcium sulfate and thereafter exposing the product formed to the action of pyrogallic acid.

In testimony whereof, I affix my signature.

JOHN PURING.